(12) United States Patent
Lupkes

(10) Patent No.: US 6,931,833 B2
(45) Date of Patent: Aug. 23, 2005

(54) PULSE COMBUSTION DEVICE

(75) Inventor: Kirk R. Lupkes, Renton, WA (US)

(73) Assignee: United Technologies Corporation, Hartford, CT (US)

( * ) Notice: Subject to any disclaimer, the term of this patent is extended or adjusted under 35 U.S.C. 154(b) by 224 days.

(21) Appl. No.: 10/426,741

(22) Filed: Apr. 30, 2003

(65) Prior Publication Data

US 2004/0216464 A1 Nov. 4, 2004

(51) Int. Cl.$^7$ .............................................. F02K 7/075
(52) U.S. Cl. .............................. 60/207; 60/208; 60/217; 60/247; 60/249
(58) Field of Search .......................... 60/204, 205, 207, 60/208, 217, 247, 249, 39.38, 39.39

(56) References Cited

U.S. PATENT DOCUMENTS 3,332,236 A * 7/1967 Laszlo ....................... 60/39.39
5,353,588 A 10/1994 Richard
5,873,240 A 2/1999 Bussing et al.
5,901,550 A 5/1999 Bussing et al.
6,003,301 A 12/1999 Bratkovich et al.
6,584,765 B1 * 7/2003 Tew et al. .................... 60/249

* cited by examiner

Primary Examiner—Ehud Gartenberg
(74) Attorney, Agent, or Firm—Bachman & LaPointe, P.C.

(57) ABSTRACT

A pulse combustion device has a number of combustors with upstream bodies and downstream nozzles. Coupling conduits provide communication between the combustors. For each given combustor this includes a first communication between a first location upstream of the nozzle thereof and a first location along the nozzle of another. There is second communication between a second location upstream of the nozzle and a second communication between a second location upstream of the nozzle of a second other combustor and a second nozzle location along the nozzle of the given combustor.

14 Claims, 4 Drawing Sheets

PULSE COMBUSTION DEVICE

BACKGROUND OF THE INVENTION (1) Field of the Invention

This invention relates to pulse combustion devices, and more particularly to pulse detonation engines.

(2) Description of the Related Art

Diverse pulse combustion technologies exist. Pulse detonation engines (PDE's) represent areas of particular development. In a generalized PDE, fuel and oxidizer (e.g. oxygen-containing gas such as air) are admitted to an elongate combustion chamber at an upstream inlet end. The air may be introduced through an upstream inlet valve and the fuel injected downstream thereof to form a mixture. Upon introduction of this charge, the valve is closed and an igniter is utilized to detonate the charge (either directly through a deflagration to detonation transition process). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion as distinguished, for example, from constant pressure combustion.

Exemplary pulse combustion engines are shown in U.S. Pat. Nos. 5,353,588, 5,873,240, 5,901,550, and 6,003,301.

BRIEF SUMMARY OF THE INVENTION

One aspect of the invention involves a pulse combustion device having a number of combustors. Each combustor has a wall surface extending from an upstream inlet to a downstream outlet. The surface defines a main body portion extending downstream from the inlet and a nozzle downstream of the main body portion. A number of coupling conduits provide communication between the combustors. For each given combustor there is a first communication between a first location upstream of the nozzle of that combustor and a first location along the nozzle of a first other combustor. There is a second communication between a second location upstream of the nozzle of a second other combustor and a second nozzle location along the nozzle of the given combustor.

In various implementations, there may be a third communication between a third location upstream of the nozzle of the given combustor and a third location along the nozzle of a third other combustor. There may be a fourth communication between a fourth location upstream of the nozzle of a fourth other combustor and a fourth nozzle location along the nozzle of the given combustor. A number of check valves may be positioned to essentially restrict the first and third communications to directions from the given combustor and the second and fourth communications to directions to the given combustor. The nozzle may have a convergent portion, a divergent portion downstream of the convergent portion, and a throat therebetween. The first and second nozzle locations may be proximate the throat of the nozzle along which they are located. A rotary inlet valve may sequentially open and close the inlets of the combustors. There may be a fuel source and an oxidizer source and, for each given combustor, fuel and oxidizer valves governing fuel and oxidizer flows from the sources to the given combustor. The combustors may be arrayed in a circle about a central longitudinal axis of the device. There may be between an exemplary three and fifty combustors, inclusive.

Another aspect of the invention involves a pulse combustion device having a number of combustors. Each combustor has a wall surface, an upstream inlet, and a downstream outlet for discharging combustion products. Means are provided for varying an effective throat cross-sectional area of each such combustor during phases of a charge/discharge cycle of such combustor.

In various implementations, for each such combustor the inlet may include a fuel inlet receiving fuel and an oxidizer inlet receiving oxidizer. Each combustor may include a convergent/divergent nozzle forming the outlet of such combustor. The means may function by discharging gas laterally into the nozzle, such gas including gas diverted from at least one other combustor.

Another aspect of the invention involves a method for operating a pulse combustion device. For each combustor, gas is discharged laterally into the combustor between the inlet and the outlet. A rate of the discharging is varied during a cycle of the given combustor so as to control a back pressure within the given combustor. The discharging may include directing gas from at least one other of the combustors.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like numbers and designations in the various drawings indicate like elements.

DETAILED DESCRIPTION

Figure 1:
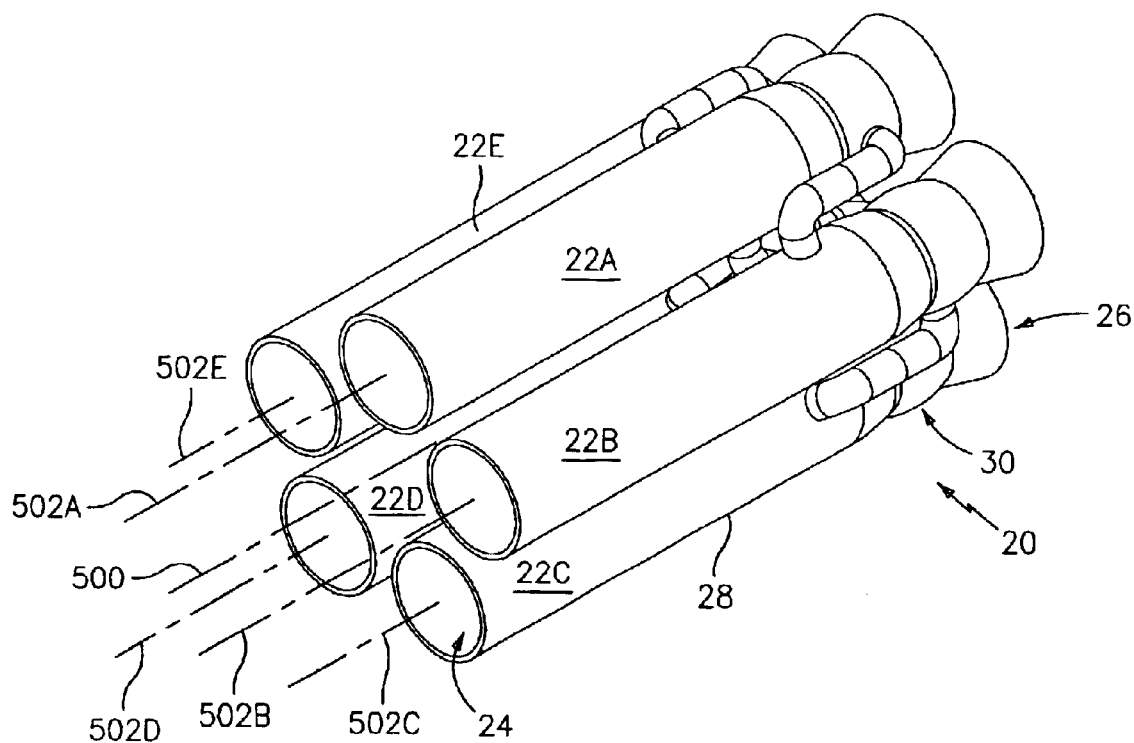
FIG. 1 is a view of a combustor cluster for pulse combustion engine.
Figure 2:
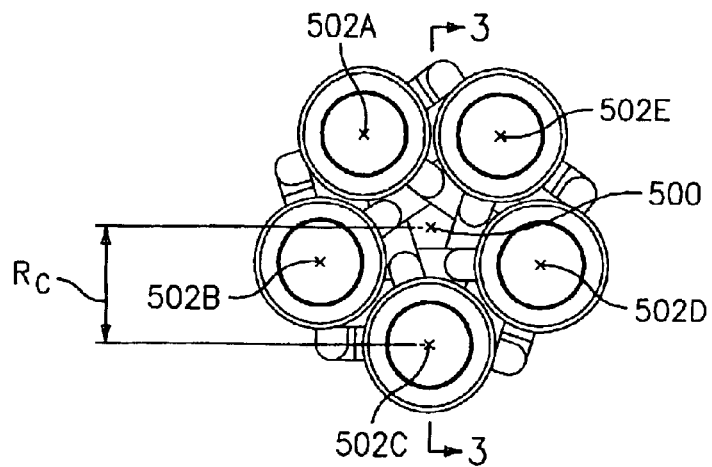
FIG. 2 is an aft view of the cluster of FIG. 1.

FIG. 1 shows a combustor cluster 20 for a pulse combustion engine. The exemplary cluster includes five combustor tubes 22A–22E arrayed about a cluster central longitudinal axis 500 and each having its own central longitudinal axis 502A–502E. Each exemplary tube 22A–22E has an upstream inlet 24 and a downstream outlet 26. A generally straight main tube portion 28 extends downstream from a rim at the inlet to a junction with a nozzle 30 which extends downstream to the outlet. In the exemplary embodiment, the axes 500 and 502A–502E are parallel, with the axes 502A–502E circumferentially arrayed about the axis 500 at a given cluster radius $R_c$ (FIG. 2). A number of conduits provide passageways interconnecting the tubes and are discussed in greater detail below.

Figure 3:
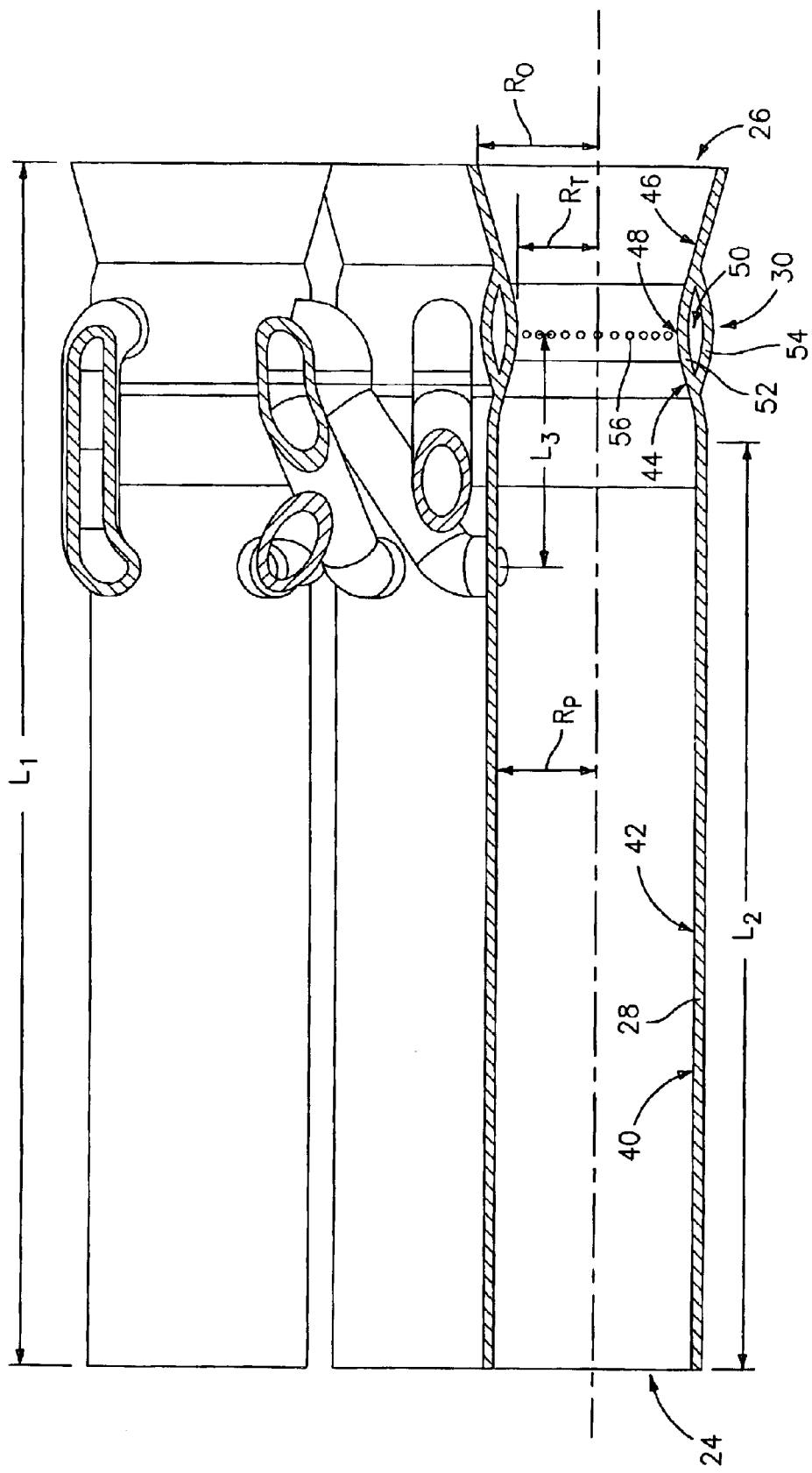
FIG. 3 is a longitudinal sectional view of the cluster of FIG. 2, taken along line 3—3.

FIG. 3 shows further details of the exemplary tubes. Each tube has an overall length $L_1$ between the inlet 24 and outlet 26. Each tube has an interior surface 40 which extends substantially longitudinally over a significant portion of the tube length. In the illustrated embodiment, the surface extends longitudinally downstream from the inlet 24 over a length $L_2$ to a location slightly downstream of the junction between the nozzle 30 and main portion 28. In the exemplary embodiment, the tubes are symmetric about their axes so that the surface 40, along this longitudinal portion 42, has a given principal tube radius $R_P$. The exemplary nozzle 30 is a convergent/divergent nozzle having a convergent upstream portion 44 extending downstream from a junction with the portion 42 and a divergent downstream portion 46 extending downstream from a junction with the convergent portion 44 to the outlet 26 (having an internal radius $R_O$). The junction between convergent and divergent portions defines a throat 48 of a throat radius $R_T$. The nozzle includes a plenum 50 circumscribing the throat. The plenum has an interior wall 52 and an exterior wall 54. In the exemplary embodiment, the interior wall 52 is a portion of a generally continuous wall structure or assembly having the surface 40 as its interior surface and its exterior surface locally defining an interior surface of the plenum. To provide communication between the plenum and the tube interior, the interior wall 52 includes a circumferential array of apertures 56. In the exemplary embodiment, the apertures are positioned proximate the throat 48 but just slightly upstream thereof.

Figure 4:
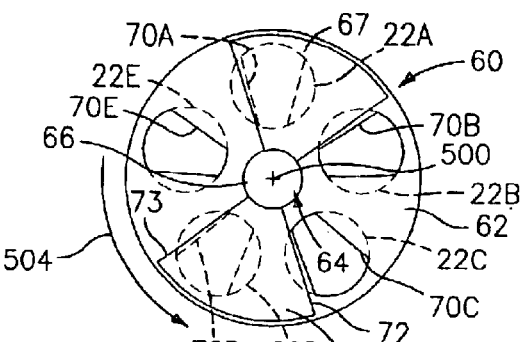
FIG. 4 is a partially schematic fore view of an inlet valve secured to the cluster of FIG. 1.

In operation, fuel and air may be introduced proximate the tube inlet, combusted, and discharged from the tube outlet. In an exemplary embodiment, a fuel/air mixture is introduced through the tube inlets. FIG. 4 shows a rotary valve assembly 60 having a fixed valve plate or body 62 having fore and aft surfaces with the latter sealingly secured to the tubes proximate the inlets thereof. A valve element or gate 64 has a hub 66 mounted to the plate 62 for relative rotation about the axis 500. A pair of lobes 67 and 68 extend radially outward from the hub. The lobes sequentially block and unblock ports 70A–70E in the plate respectively associated with the tubes 22A–22E. With the valve element 64 rotating in a given direction 504 about the axis 500 relative to the cluster, each lobe 67, 68 has a leading edge 72 and a trailing edge 73. The exemplary ports are formed as sectors about the axis 500 of the superposed tube inlets. FIG. 4 shows the valve assembly 60 with the gate 64 in an orientation wherein the port 70A for the first tube 22A has just been fully lapped by a leading portion of the first lobe 67 to close the port. The port 70B for the second tube 22B has just been fully opened with the trailing edge 73 of first lobe 67 having passed therebeyond. The port 70C for the third tube 22C has been open and the leading edge 72 of the second lobe 68 is about to begin to lap and close the port. The port 70D for the fourth tube 22D has been blocked and the trailing edge 73 of the second lobe 68 is about to underlap and thereby open the port. The port 70E for the fifth tube 22E has been for an interval and will remain, for an interval, fully open, the trailing edge of second lobe having already passed therebeyond and the leading edge of the first lobe having not yet reached proximity thereto.

Figure 5:
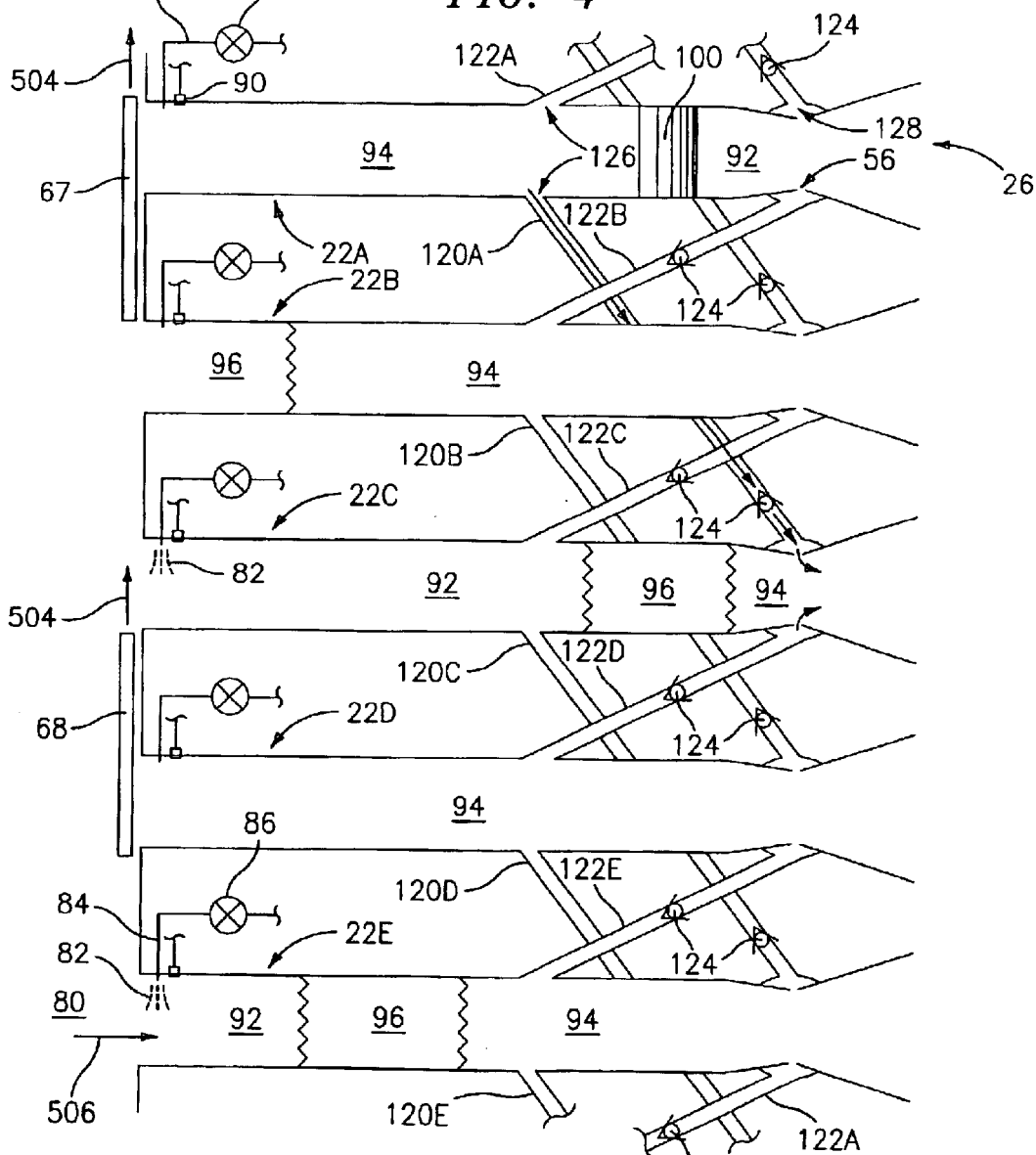
FIG. 5 is a partially schematic upwrapped longitudinal circumferential sectional view of the cluster of FIG. 4.

FIG. 5 schematically shows the conditions of the tubes 22A–22E and the relative positions of the gate lobes 67 and 68. Each tube goes through a combustion cycle. With the exemplary two-lobed gate valve, there are two combustion cycles per gate valve rotation. The cycle involves charging each tube with fuel and oxidizer to form a fuel/oxidizer mixture. The mixture is then detonated with a detonation wave propagating from the inlet toward the outlet. After detonation, there is an initial high pressure discharge from the outlet. Thereafter, there is a recharging. In the exemplary implementation, and as discussed below, the high pressure discharge is followed by a low pressure discharge and the simultaneous, consecutive, or overlapping introduction of a purge buffer charge. An exemplary purge buffer consists essentially of the oxidizer or a lean mixture or the fuel or a rich mixture.

The exemplary system of FIGS. 4 and 5 may be operated in a ram-fed or compressor-fed situation wherein air 80 is flowed in a downstream direction 506 through the open ports. Fuel 82 may be introduced through a fuel conduit 84 controlled by a valve 86. In the exemplary embodiment, each combustor tube has its own one or more conduits 84 with outlets positioned proximate the tube inlet and controlled by an associated valve 86, in turn, electronically (alternatively, pneumatically or hydraulically) controlled by a control system (not shown). The fuel conduit outlets thus serve as fuel inlets for the associated combustor tubes.

In the specific condition of FIGS. 4 and 5, the inlet of the first tube 22A has just recently closed. Upon closing, an igniter (e.g., a sparkplug 90) positioned proximate the inlet has initiated combustion of the fuel/air mixture 92 which has substantially filled the tube. A detonation wavefront 100 is shown having propagated most of the way through the mixture toward the outlet 26, leaving combustion products 94 therebehind in a high pressure condition. Generally, during a brief initial stage of the interval wherein the tube is closed, the detonation wavefront quickly passes all the way through the mixture. Thereafter, the combustion products 94 are expelled at relatively high pressure, the expulsion reducing the pressure. In the exemplary two-cycle per rotation embodiment, the fourth tube 22D is shown at the end of its closed interval so that its combustion products 94 are in a relatively low pressure state over the entire tube length. In the illustrated condition, the second tube 22B is shown in a subsequent portion of the cycle wherein a purge buffer charge 96 of the air 80 is being introduced through the tube inlet, the ram or compressor effect continuing to drive the combustion products 94 out at a relatively low pressure. The purge buffer charge may be created by simply shutting the valve 86 of the associated fuel conduit for a brief interval and then reopening the valve to begin to generate the mixture 92. The fifth tube 22E is shown in an initial stage of this charging interval and the third tube 22C is shown in a subsequent stage of this charging interval during which the fuel/air charge and purge buffer charge downstream thereof continue to drive the remainder of the combustion products further downstream.

The combustor tubes are interconnected to permit certain passage of gas between the respective tubes at various points in their cycles. The exemplary interconnection is by passageways formed by associated connecting tubes. In certain embodiments, every combustor tube may be connected to one or more of the other tubes by one or more connecting tubes per connected combustor tube pair. In an exemplary embodiment, every combustor tube is coupled to four others. A minimal number of tubes for such a four-connection system is, by definition, five, with each combustor tube connected to every other combustor tube. For other numbers of connections, the minimum would change accordingly. In the exemplary embodiment, for each connecting tube there is a preferred direction of flow from one of the connected pair of combustor tubes to the other. For ease of reference, the connecting tubes having a preferred flow direction away from a given combustor tube are identified with the reference letter associated with such combustor tube. Accordingly, in the exemplary embodiment of FIG. 5, each combustor tube 22A–22E has associated therewith a first connecting tube 120A–120E and a second connecting tube 122A–122E. Each of these connecting tubes has a one-way check valve 124 mounted therein to restrict communication to the preferred direction. Each exemplary connecting tube has a port at each end thereof. The preferred flow direction establishes these as an inlet port 126 and an outlet port 128. In the illustrated embodiment, the inlet ports are at longitudinal positions along the main tube portions 28 of the source combustor tubes and the outlet ports 128 are in the plenum exterior walls of the associated destination combustor tubes. The plenums and connecting tubes combine to define associated interconnecting passageways with the plenum outlet apertures 56 serving as the passageway outlet apertures. In the exemplary embodiment, the passageways have a longitudinal length $L_3$ (FIG. 5—the length along the passageways naturally being somewhat longer).

In the exemplary embodiment, the first connecting tube 120A of the first combustor tube 22A extends to the third combustor tube 22C. The second connecting tube 122A of the first combustor tube 22A extends to the fifth combustor tube 22E (the first tube over in the direction 504). The first connecting tube 120A connects the first combustor tube 22A to the third combustor tube 22C (the second tube over in an opposite direction). The first and second connecting tubes of the other combustor tubes connect to the similarly relatively oriented combustor tubes.

During the operational cycle of each combustor tube, the four connecting tubes with which it is associated come into play as follows: As the wavefront 100 passes the connecting tube inlet ports of the two tubes extending from a given combustor (e.g., 120A and 122A for the first combustor tube 22A in the condition of FIG. 5), portions of the combustion gases 94 are vented through such connecting tubes. A first portion is directed to the throat of the third combustor tube 22C and a second portion is directed to the throat of the fifth combustor tube 22E. The first and second portions are introduced at respective second and first fuel/air charging substages for a given combustor tube. The flows act to resist discharge of the low pressure combustion products through the throat, effectively serving as a further throat constriction. To this end, the apertures 56 are advantageously slightly upstream of the exact mechanical throat so as to maximize the constriction effect and minimize any counteracting entrainment effect. The restriction effect increases the backpressure on the remaining combustion gases and, thereby, the pressure of the fuel/air mix 92. The pressure increase is associated with a molar/density increase, thereby permitting a greater amount of fuel and air to be combusted in each cycle. With the first or second flow portions flowing into a given plenum through a given first or second connecting tube associated with such plenum, the check valve in the other connecting tube associated with that plenum prevents a reverse flow. In other stages, the pressure difference across a given connecting tube may be smaller. For example, in the FIG. 5 condition, there may be a much smaller pressure difference across the connecting tube 122B between low pressure combustion gases in the second tube 22B and the uncombusted gases near the throat of the first combustor tube 22A than across the connecting tube 120A between the first combustor tube and third combustor tube. Either a bias in the check valve in the connecting tube 122B can prevent flow therethrough or, if permitted, the scale of such flow may be relatively small.

The various dimensions will largely be matters of engineering choice and optimization. An exemplary number of combustor tubes is between three and fifty, inclusive (more narrowly, three and six for an exemplary PDE and twenty and fifty for an exemplary hybrid (e.g., used as a gas turbine engine combustor)). Exemplary combustor tube diameters are in the vicinity of 25–200 mm. Exemplary combustor tube lengths are in the vicinity of 75 mm –2.0 m, with longer lengths generally being associated with the larger diameters. Nevertheless, other sizes (especially larger sizes) are possible. In the exemplary embodiments, the majority of combustion gases generated in a given combustor tube will be discharged from the outlet of such tube rather than diverted to the other tubes. A narrower range of exemplary diversion is less than 20%. The exact location of the connecting tube inlets may be influenced by numerous considerations including the number and arrangement of combustor tubes, their cycle timing, and the like. Theoretically this may be almost anywhere from the combustor tube inlet downstream and including the possibility of direct cross-coupling of nozzle plenums. Nevertheless, in an exemplary group of embodiments, the connecting tube inlets are positioned in the downstream halves of the longitudinal portions 42 and thus close to or in the downstream halves of the combustor tubes as a whole.

Figure 6:
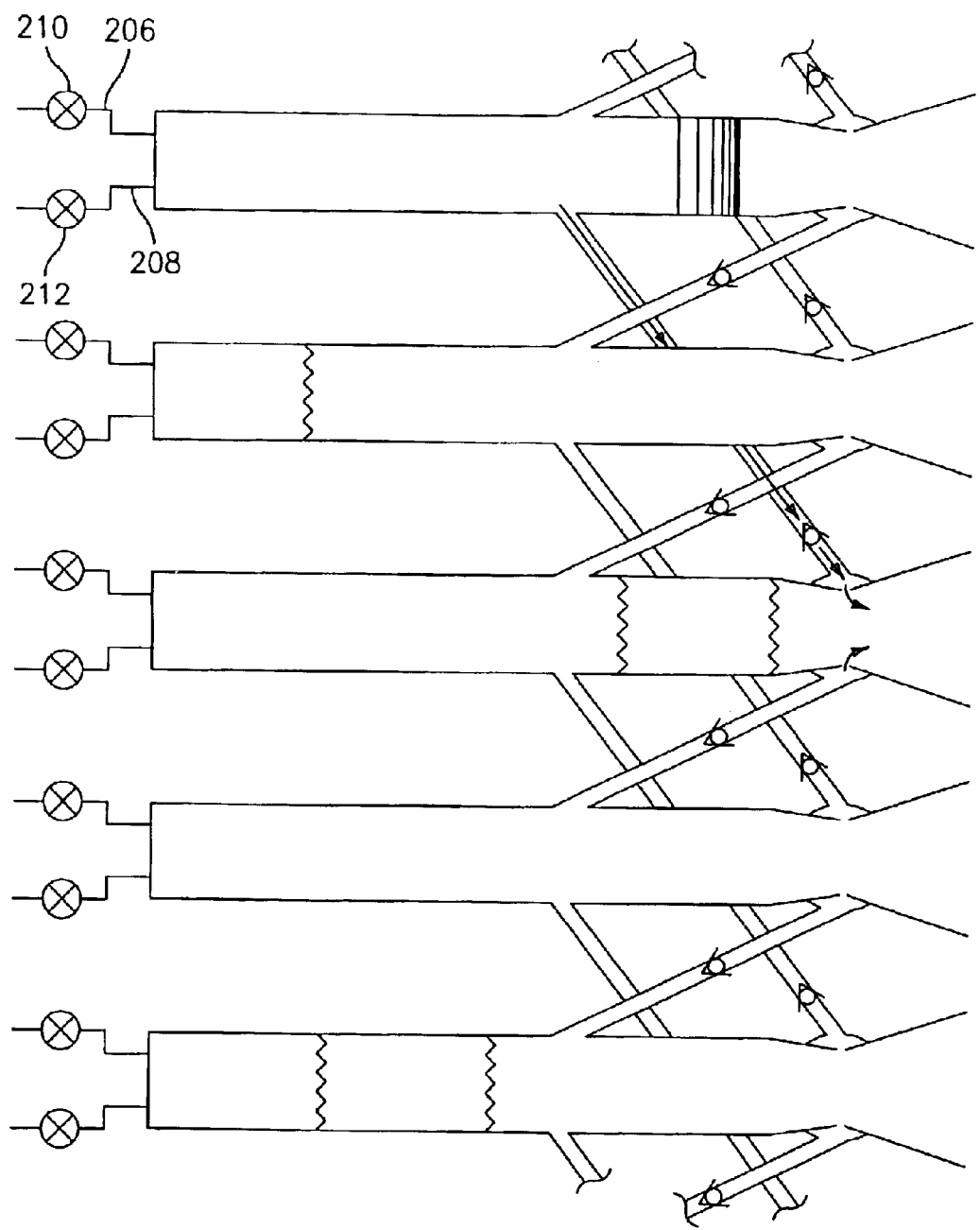
FIG. 6 is a partially schematic unwrapped circumferential sectional view of an alternate valve/cluster combination.

FIG. 6 shows an alternate system utilizing similar combustor tubes and connecting tubes but with an alternate induction system. For each combustor tube, fuel and oxidizer are introduced proximate the inlet ends thereof via fuel and oxidizer conduits 206 and 208 controlled by respective electronically-actuated valves 210 and 212. Conduit outlets serve as combustor tube inlets for the fuel and oxidizer. Independent control of the two valves of each combustor tube provides enhanced flexibility and combustion cycle timing, especially during operation outside of baseline conditions. For example, timing may be altered during startup and during transition to or from a baseline condition or during steady site operation outside of the baseline condition. Freed from the restrictions associated with the rotary gate valve, the relative timing of the cycles of the combustor tubes in the array can be altered so that the connecting tubes may be used in a greater variety of combinations. This also would ease the utilization of groupings other than circular arrays of combustor tubes (e.g., linear arrays). Alternate ram-fed implementations might have individual rotary valves associated with individual combustor tubes or with subgroups of the combustor tubes.

One or more embodiments of the present invention have been described. Nevertheless, it will be understood that various modifications may be made without departing from the spirit and scope of the invention. For example, even with the basic construction illustrated, many parameters may be utilized to influence performance. These include the location of the connecting tube ports, the flowpath length along the connecting tubes (to influence timing considerations), port orientation and geometry, tube geometry (including modifications such as bifurcation, etc.) and the like. Accordingly, other embodiments are within the scope of the following claims.

What is claimed is:

1. A pulse combustion device comprising:
   a plurality of combustors, each comprising a wall surface extending from an upstream inlet to a downstream outlet, the wall surface defining:
      a main body portion extending downstream from the inlet; and
      a nozzle downstream of the main body portion; and
   a plurality of coupling conduits providing communication between the combustors, including for each given combustor:
      first communication between a first location upstream of the nozzle of the given combustor and a first nozzle location along the nozzle of a first other of the plurality of combustors; and second communication between a second location upstream of the nozzle of a second other of the plurality of combustors and a second nozzle location along the nozzle of the given combustor.

2. The device of claim 1 wherein:
the communication includes for each given combustor:
third communication between a third location upstream of the nozzle of such given combustor and a third nozzle location along the nozzle of a third other of the plurality of combustors; and
fourth communication between a fourth location upstream of the nozzle of a fourth other of the plurality of combustors and a fourth nozzle location along the nozzle of the given combustor.

3. The device of claim 2 further comprising a plurality of check valves positioned to:
essentially restrict the first communication to a direction from the given combustor;
essentially restrict the second communication to a direction to the given combustor;
essentially restrict the third communication to a direction from the given combustor; and
essentially restrict the fourth communication to a direction to the given combustor.

4. The device of claim 1 wherein:
the nozzle has a convergent portion, a divergent portion downstream of the convergent portion, and a throat therebetween; and
the first and second nozzle locations are proximate the throat of the nozzle along which they are located.

5. The device of claim 1 further comprising a rotary inlet valve sequentially opening and closing the inlets of the plurality of combustors.

6. The device of claim 1 further comprising:
a fuel source;
an oxidizer source; and
for each given combustor:
a fuel valve governing fuel flow from the fuel source to the given combustor; and
an oxidizer valve governing oxidizer from the oxidizer source to the given combustor.

7. The device of claim 1 wherein the plurality of combustors are arrayed in a circle about a central longitudinal axis of the device.

8. The device of claim 1 wherein the plurality of combustors comprises between three and fifty combustors, inclusive.

9. The device of claim 1 wherein the plurality of combustors comprises between three and six combustors, inclusive.

10. A pulse combustion device comprising:
a plurality of combustors, each comprising:
a wall surface;
an upstream inlet; and
a downstream outlet for discharging combustion products; and
means for varying an effective throat cross-sectional area of each such combustor during phases of a charge/discharge cycle of such combustor.

11. The device of claim 10 wherein for each such combustor, the inlet comprises a fuel inlet receiving fuel and an oxidizer inlet receiving oxidizer.

12. The device of claim 10 wherein:
each such combustor comprises a convergent/divergent nozzle and forming the outlet of such combustor; and
the means functions by discharging gas laterally into the nozzle, such gas including gas diverted from at least one other of the plurality of combustors.

13. A method for operating a pulse combustion device, the device comprising:
a plurality of combustors, each comprising:
a wall surface;
an upstream inlet; and
a downstream outlet, the method comprising for each combustor:
discharging gas laterally into the combustor between the inlet and the outlet; and
varying a rate of the discharging during a cycle of the given combustor so as to control a backpressure within the given combustor.

14. The method of claim 13 wherein the discharging gas comprises directing gas from at least one other of the plurality of combustors.

* * * * *